United States Patent
Bian et al.

(10) Patent No.: US 12,406,472 B2
(45) Date of Patent: Sep. 2, 2025

(54) METHOD OF TRAINING IMAGE GENERATION MODEL, AND METHOD OF GENERATING IMAGE

(71) Applicant: BEIJING BAIDU NETCOM SCIENCE TECHNOLOGY CO., LTD., Beijing (CN)

(72) Inventors: Donghai Bian, Beijing (CN); Yuwei Wu, Beijing (CN); Guangzhi Sheng, Beijing (CN); Yehan Zheng, Beijing (CN); Weihua Peng, Beijing (CN); Weijian Xu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 413 days.

(21) Appl. No.: 18/086,556

(22) Filed: Dec. 21, 2022

(65) Prior Publication Data
US 2023/0133981 A1    May 4, 2023

(30) Foreign Application Priority Data
Dec. 23, 2021   (CN) .......................... 202111620055.9

(51) Int. Cl.
*G06V 10/00*    (2022.01)
*G06V 10/74*    (2022.01)
*G06V 10/771*   (2022.01)

(52) U.S. Cl.
CPC .......... *G06V 10/771* (2022.01); *G06V 10/761* (2022.01)

(58) Field of Classification Search
CPC ........ G06N 20/00; G06N 20/10; G06N 20/20; G06V 10/82; G06V 10/771; G06V 10/774; G06V 10/778; G06V 10/761
See application file for complete search history.

(56) References Cited

U.S. PATENT DOCUMENTS 5,960,448 A * 9/1999 Reichek ................ G06F 3/0481
                                                         715/236
10,489,126 B2 * 11/2019 Kumar .................. G06V 30/422
(Continued)

FOREIGN PATENT DOCUMENTS

| CN | 109948734 | 6/2019 |
| CN | 111461203 | 7/2020 |

(Continued)

OTHER PUBLICATIONS

Office Action issued in corresponding Chinese Patent Application No. 202111160055.9 dated Oct. 19, 2022.
(Continued)

*Primary Examiner* — Amir Alavi
(74) *Attorney, Agent, or Firm* — Pillsbury Winthrop Shaw Pittman, LLP

(57) ABSTRACT

A method of training an image generation model, and a method of generating an image. A specific implementation solution includes: acquiring a first image sample and a first text sample matched with the first image sample; performing an enhancement on at least one type of sample in the first image sample and the first text sample according to a predetermined knowledge graph, so as to obtain at least one type of sample in a second image sample obtained by the enhancement and a second text sample obtained by the enhancement; and training the image generation model according to a training set selected from a first training set, a second training set or a third training set, until the image generation model converges.

20 Claims, 4 Drawing Sheets

(56) References Cited

U.S. PATENT DOCUMENTS

| | | | |
|---|---|---|---|
| 10,902,251 B2* | 1/2021 | Goble | G06F 3/0304 |
| 11,195,313 B2* | 12/2021 | Guo | G06N 3/08 |
| 11,270,166 B2* | 3/2022 | Chai | G06V 20/35 |
| 11,699,298 B2* | 7/2023 | Ma | G06V 10/761 |
| | | | 382/103 |
| 11,928,183 B2* | 3/2024 | Sun | G06V 10/776 |
| 11,961,203 B2* | 4/2024 | Lim | G06N 3/045 |
| 12,142,036 B2* | 11/2024 | Zeng | G06F 40/40 |
| 12,223,689 B2* | 2/2025 | Hamedi | G06F 16/438 |
| 12,283,084 B2* | 4/2025 | Saraee | G06V 10/761 |
| 2016/0085742 A1 | 3/2016 | Mahmud et al. | |
| 2021/0192142 A1 | 6/2021 | Feng et al. | |
| 2023/0133981 A1* | 5/2023 | Bian | G06V 10/778 |
| | | | 382/155 |

FOREIGN PATENT DOCUMENTS

| | | |
|---|---|---|
| CN | 111898704 | 11/2020 |
| CN | 112612900 | 4/2021 |
| CN | 112966617 | 6/2021 |
| CN | 113190698 | 7/2021 |
| CN | 113449135 | 9/2021 |
| CN | 113537487 | 10/2021 |
| CN | 113627567 | 11/2021 |
| EP | 3754549 | 12/2020 |

OTHER PUBLICATIONS

Xue-gui Li et al., "A Semi-supervised Dynamic Sample Set Clustering Algorithm Based On Multi-instance Learning", Chemical Automation and Instrumentation, vol. 11, pp. 1153-1157 (2016).

* cited by examiner

METHOD OF TRAINING IMAGE GENERATION MODEL, AND METHOD OF GENERATING IMAGE

This application claims the priority of Chinese Patent Application No. 202111620055.9, filed on Dec. 23, 2021, which is hereby incorporated in its entirety by reference.

TECHNICAL FIELD

The present disclosure relates to a field of a computer technology, in particular to fields of knowledge graph, deep learning and other artificial intelligence technologies, and specifically to a method of training an image generation model, and a method of generating an image.

BACKGROUND

At present, a great progress has been made in a field of an image generation, but there are still some challenges in a cross-modality image generation. It is a typical research scenario to generate an image containing a description text according to the description text, and this research may be applied to a plurality of scenarios, such as an abstract painting generation, a character generation, a landscape generation, and so on. However, it is difficult for existing image generation solutions to generate a real and valid image for a commonsense and factual description text.

SUMMARY

The present disclosure provides a method of training an image generation model, and a method of generating an image.

According to a first aspect of the present disclosure, a method of training an image generation model is provided, including: acquiring a first image sample and a first text sample matched with the first image sample; performing an enhancement on at least one type of sample in the first image sample and the first text sample according to a predetermined knowledge graph, so as to obtain at least one type of sample in a second image sample obtained by the enhancement and a second text sample obtained by the enhancement; and training the image generation model according to a training set selected from a first training set, a second training set or a third training set, until the image generation model converges, wherein the first training set includes the second image sample and the first text sample, the second training set includes the first image sample and the second text sample, and the third training set includes the second image sample and the second text sample.

According to a second aspect of the present disclosure, a method of generating an image is provided, including: acquiring a text; processing the text by an image generation model, so as to obtain an image corresponding to the text according to an output of the image generation model, wherein the image generation model is trained by the method of training the image generation model provided by any embodiment of the present disclosure.

According to a third aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method of training the image generation model or the method of generating the image provided by any embodiment of the present disclosure.

According to a fourth aspect of the present disclosure, a non-transitory computer-readable storage medium having computer instructions therein is provided, and the computer instructions are configured to cause a computer to implement the method of training the image generation model or the method of generating the image provided by any embodiment of the present disclosure.

According to a fifth aspect of the present disclosure, a computer program product containing a computer program is provided, and the computer program, when executed by a processor, causes the processor to implement the method of training the image generation model or the method of generating the image provided by any embodiment of the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Exemplary embodiments of the present disclosure will be described below with reference to accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following descriptions.

In descriptions of embodiments of the present disclosure, it should be understood that terms "first" and "second" are merely used for description purposes, and may not be interpreted as indicating or implying relative importance or implicitly indicating a quantity of indicated technical features. Thus, the features defined as "first" and "second" may explicitly or implicitly include one or more of the features. In descriptions of embodiments of the present disclosure, unless otherwise specified, "plurality" means two or more.

It should be further understood that the expression "and/or" used in embodiments of the present disclosure includes all or any unit and all combinations of one or more matching listed items.

Those skilled in the art may understand that unless otherwise defined, all terms (including technical terms and scientific terms) used in embodiments of the present disclosure have the same meanings as commonly understood by those of ordinary skilled in the art to which the present disclosure belongs.

Technical solutions of the present disclosure will be described in detail below with specific embodiments.

Figure 1:
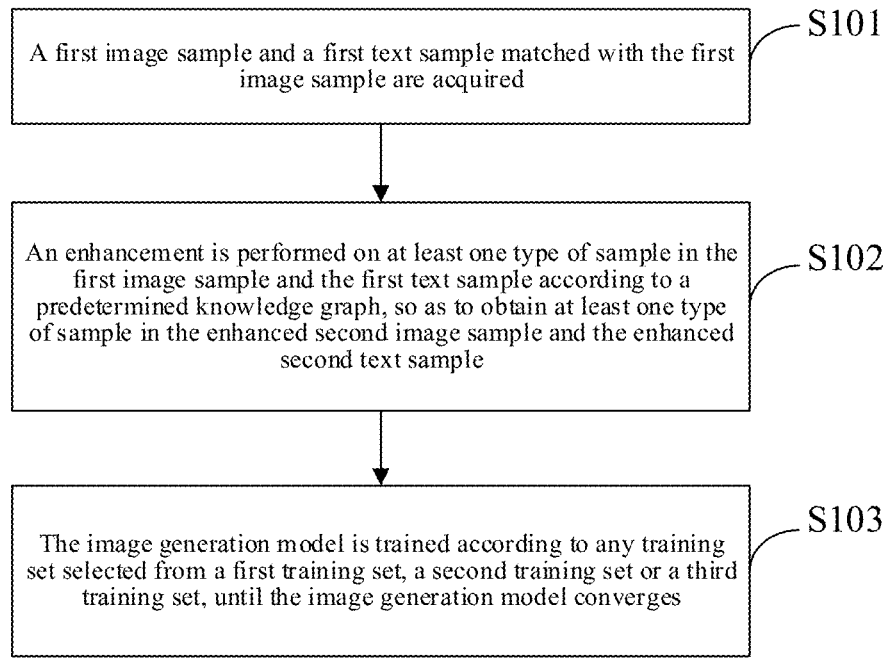
FIG. 1 shows a schematic flowchart of a method of training an image generation model provided by embodiments of the present disclosure.

According to embodiments of the present disclosure, the present disclosure provides a method of training an image generation model. As shown in FIG. 1, the method includes the following steps.

In S101, a first image sample and a first text sample matched with the first image sample are acquired.

It is possible to acquire a plurality of first image samples, and it is possible to acquire a plurality of first text samples. Each first image sample may be matched with at least one first text sample. In an example, for the matched image (as the first image sample) and text (as the first text sample), a content of the text is a content for describing the image; each first text sample may be matched with at least one first image sample, that is, a description content in each first text sample may correspond to an image content presented by at least one first image sample.

In S102, an enhancement is performed on at least one type of sample in the first image sample and the first text sample according to a predetermined knowledge graph, so as to obtain at least one type of sample in the enhanced second image sample and the enhanced second text sample.

Optionally, performing an enhancement on at least one type of sample in the first image sample and the first text sample according to a predetermined knowledge graph, so as to obtain at least one type of sample in the enhanced second image sample and the enhanced second text sample includes: performing an enhancement on the first image sample according to the predetermined knowledge graph, so as to obtain the enhanced second image sample. A specific process is as follows.

A first entity information of the first image sample is acquired, and first knowledge data matched with the first entity information is acquired from the knowledge graph. The first entity information of the first image sample is updated according to the first knowledge data, so as to obtain the second image sample.

An entity information of the first image sample may be acquired as the first entity information, and the first entity information may be an entity tag, such as tiger, bicycle, animal, vehicle and other entity tags.

By updating the entity information of the first image sample based on the knowledge data in the knowledge graph, a knowledge enhancement of the first image sample may be achieved, and the knowledge of the first image sample may be improved.

In an optional implementation, the entity information of the first image sample may be acquired by using at least one algorithm such as a target detection algorithm and a picture classification algorithm. The target detection algorithm may be an algorithm of R-CNN (Region-Convolutional Neural Network) series, such as Faster R-CNN (Fast Region-Convolutional Neural Network) algorithm. The picture classification algorithm may be a ResNet (Residual Network) algorithm. The target detection algorithm and the picture classification algorithm in embodiments of the present disclosure may also be other algorithms than the above example, which is not limited in embodiments of the present disclosure, as long as a function of acquiring the entity information of the image sample (such as the first image sample) may be achieved.

In an optional embodiment, updating the first entity information according to the first knowledge data includes: filling the first knowledge data into the first entity information. The filled first entity information includes the original first entity information and the first knowledge data, that is, the original first entity information and the filled first knowledge data together serve as the filled (updated) first entity information. The first knowledge data may be at least one selected from an alias, an abbreviation, or an interpretation of the first entity information in the pre-built knowledge graph.

Embodiments of the present disclosure do not limit a specific form of filling. The filling may be in a parallel form, such as "entity A, entity B, entity C", or in a form of notes, such as "entity A (also known as entity B or entity C)", or in other forms than the above examples.

In an example, if the entity tag of the first image sample identified by the target detection algorithm is a giant panda, the aliases of the giant panda (such as bamboo bear, iron eater) may be acquired from the pre-built knowledge graph. The original entity tag, giant panda, and the acquired aliases, bamboo bear and iron eater, may together serve as a new entity information of the first image sample, and the first image sample containing the new entity information is used as the second image sample.

Optionally, performing an enhancement on at least one type of sample in the first image sample and the first text sample according to the predetermined knowledge graph to obtain at least one type of sample in the enhanced second image sample and the second text sample may include: performing an enhancement on the first text sample according to the predetermined knowledge graph to obtain the enhanced second text sample. A specific process may be implemented through any one of a first embodiment and a second embodiment as follows.

In the first embodiment, a second entity information of the first text sample is acquired, and second knowledge data matched with the second entity information is acquired from the predetermined knowledge graph. The second entity information of the first text sample is updated according to the second knowledge data, so as to obtain the second text sample.

An entity information of the first text sample may be acquired as the second entity information, and the second entity information may be an information of a named entity. Optionally, the second entity information of the first text sample may be acquired through at least one algorithm such as a natural language entity recognition algorithm, a phrase recognition algorithm, and the like. Both the entity recognition algorithm and the phrase recognition algorithm may be LSTM (Long Short-Term Memory) algorithm or other algorithms, which is not limited in embodiments of the present disclosure, as long as a function of acquiring the entity information of the text sample (such as the first text sample) may be achieved.

By updating the entity information of the first text sample according to the knowledge data in the knowledge graph, a knowledge enhancement of the first text sample may be achieved, and the knowledge of the first text sample may be improved.

In an optional embodiment, updating the second entity information according to the second knowledge data may include at least one operation selected from: filling the second knowledge data into the second entity information, or replacing the second entity information with the second knowledge data. The filled second entity information includes the original second entity information and the second knowledge data, that is, the original second entity information and the second knowledge data together serve as the filled (updated) second entity information. The replaced second entity information includes the second knowledge data, that is, the second knowledge data replaces the original second entity information as the replaced (updated) second entity information. The second knowledge data may be at least one selected from an alias, an abbreviation, or an interpretation of the second entity information in the pre-built knowledge graph.

In an example, the content of the first text sample is "Akita dog sits at the door and watches the sunset". A named entity "Akita dog" may be recognized by the entity recognition algorithm or the phrase recognition algorithm, and it may be acquired from the pre-built knowledge graph that an interpretative information of Akita dog is "canine gray wolf". The interpretative information may be filled into the original named entity "Akita dog". The filled second entity information is "Akita dog (canine gray wolf)", and the content of the second text sample obtained is "Akita dog (canine gray wolf) sits at the door and watches the sunset".

In an example, the content of the first text sample is "Akita dog sits at the door and watches the sunset". A named entity "Akita dog" may be recognized by the entity recognition algorithm or the phrase recognition algorithm, and it may be acquired from the pre-built knowledge graph that Akita dog has an alias "Dahuang". The original named entity "Akita dog" may be replaced with this alias, and the content of the second text sample obtained may be "Dahuang sits at the door and watches the sunset".

In another optional embodiment, updating the second entity information according to the second knowledge data may include: filling the second knowledge data into the second entity information, and/or replacing the second entity information with the second knowledge data; performing an expression enhancement on the filled or replaced second entity information, and acquiring the entity information of the first text sample obtained by the expression enhancement; and filling or replacing the entity information according to the second knowledge data. Similar expression enhancement may be repeatedly performed multiple times to continuously perform an expression enhancement, an entity information acquisition, and an entity information filling/replacement on the entity information of the first text sample, so as to obtain the finally updated sample as the second text sample. The number of times that the expression enhancement, the entity information acquisition and the entity information update are repeatedly performed may be set according to actual needs.

In the second embodiment, an expression enhancement is performed on the first text sample; a third entity information of the first text sample obtained by the expression enhancement is acquired, and third knowledge data matched with the third entity information is acquired from the predetermined knowledge graph; and the third entity information of the first text sample is updated according to the third knowledge data, so as to obtain the second text sample.

In an optional embodiment, the expression enhancement may be performed on the first text sample by at least one technology such as a text retelling technology and a translation return technology, so as to increase a diversity of expressions of the first text sample. A plurality of expressions may form a plurality of first text samples, so that the number of first text samples may be increased. The text retelling technology and the translation return technology may be implemented based on a seq2seq (Sequence-to-sequence) model, or may be implemented in other ways, which is not limited in embodiments of the present disclosure, as long as the expression enhancement of the text sample (such as the first text sample) may be achieved.

An entity information of the first text sample obtained by the expression enhancement may be acquired as the third entity information, and the third entity information may be an information of a named entity. Optionally, the third entity information of the first text sample obtained by the expression enhancement may be acquired through at least one algorithm such as a natural language entity recognition algorithm and a phrase recognition algorithm.

Optionally, for a specific manner of updating the third entity information according to the third knowledge data, reference may be made to the manner of updating the second entity information according to the second knowledge data in the first embodiment, which will not be repeated here.

In S103, the image generation model is trained according to any training set selected from a first training set, a second training set or a third training set, until the image generation model converges.

The first training set includes the second image sample and the first text sample, the second training set includes the first image sample and the second text sample, and the third training set includes the second image sample and the second text sample. For a pair of the first image sample and the first text sample that have a matching relationship, the second image sample obtained by the knowledge enhancement of the first image sample also has a matching relationship with the first text sample, the second text sample obtained by the knowledge enhancement of the first text sample also has a matching relationship with the first image sample, and the second image sample obtained by the knowledge enhancement of the first image sample also has a matching relationship with the second text sample obtained by the knowledge enhancement of the first text sample.

In an example, the image generation model may be a Transform model. In other examples, the image generation model may also be other types of models, such as RNN (Recurrent Neural Network), CNN (Convolutional Neural Network), and LSTM.

Figure 2:
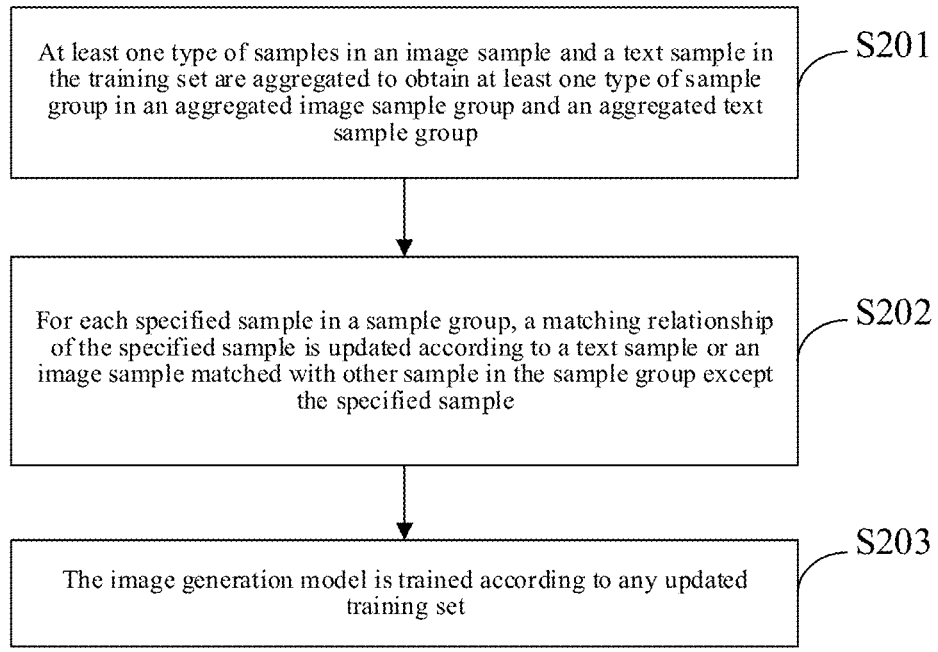
FIG. 2 shows a partial schematic flowchart of another method of training an image generation model provided by embodiments of the present disclosure.

Optionally, as shown in FIG. 2, step 103 of training the image generation model according to any training set selected from the first training set, the second training set or the third training set may include steps S201 to S203.

In S201, at least one type of samples in an image sample and a text sample in the training set are aggregated to obtain at least one type of sample group in an aggregated image sample group and an aggregated text sample group.

The image sample is the first image sample or the second image sample, and the text sample is the first text sample or the second text sample. In the first training set, the image sample is the second image sample, and the text sample is the first text sample; in the second training set, the image sample is the first image sample, and the text sample is the second text sample; in the third training set, the image sample is the second image sample, and the text sample is the second text sample.

Optionally, a specific manner of aggregating the image samples in any training set is to determine, for any training set, a plurality of image samples having a same entity information, and aggregate the plurality of image samples into one image sample group. By aggregating the image samples in the training set based on whether the entity information is the same, it is possible to improve an aggregation effect and obtain an image sample group with more consistent entity information.

Optionally, determining whether a plurality of image samples having the same entity information are contained or not may be implemented by the following two methods. In a first method, it is determined whether the image samples in the current training set include a plurality of image samples having a same entity information. In a second method, it is determined whether an entity quantity of each image sample is greater than a predetermined entity quantity threshold; and a plurality of image samples having a same entity information are determined from each image sample having an entity quantity greater than the entity quantity threshold. An image sample having a large entity quantity may be selected based on the entity quantity threshold, and the image sample having a large entity quantity may provide more valid information. The image samples having the same entity information determined on this basis may have a higher quality, which helps improve a quality of training.

Optionally, a specific manner of aggregating the text samples in any training set may include: for any training set, determining a plurality of text samples having a same entity information, and aggregating the plurality of text samples into one text sample group. By aggregating the text samples in the training set based on whether the entity information is the same, it is possible to improve the aggregation effect and obtain a text sample group with more consistent entity information.

Optionally, determining whether a plurality of text samples having the same entity information are contained or not may be implemented by the following two methods. In a first method, it is determined whether the text samples in the current training set include a plurality of image samples having a same entity information. In a second method, it is determined whether an entity quantity of each text sample is greater than a predetermined entity quantity threshold; and a plurality of text samples having a same entity information are determined from each text sample having an entity quantity greater than the entity quantity threshold. A text sample having a large entity quantity may be selected based on the entity quantity threshold, and the text sample having a large entity quantity may provide more valid information. The text samples having the same entity information determined on this basis may have a higher quality, which helps improve a quality of training.

The same entity information in embodiments of the present disclosure means that the entity information has same semantics rather than an exactly same expression. For example, the three entity information of giant panda, bamboo bear and iron are obviously different in expressions, but all represent the same animal. Therefore, the three entity information have the same semantics. When it is determined whether two entity information have the same semantics, it is possible to determine according to a similarity between the two entity information. If the similarity between the entity information is greater than a predetermined similarity threshold, it may be considered that the two entity information have the same semantics. The similarity between the entity information may be obtained according to a tf-idf (term frequency-inverse document frequency) method, a jaccard similarity algorithm, or the like.

In embodiments of the present disclosure, the entity quantity threshold, the coincidence threshold and the similarity threshold may be preset according to actual requirements or empiric values.

In S202, for each specified sample in a sample group, a matching relationship of the specified sample is updated according to a text sample or an image sample matched with other sample in the sample group except the specified sample.

For an image sample group, each image sample in the image sample group may be used as the specified sample (specified image sample) for the above-mentioned update. In an example, if an image sample group includes ten image samples, then for an image sample X in the ten image samples, the text sample matched with the image sample X may be updated according to the text samples matched with the other nine image samples.

For a text sample group, each text sample in the text sample group may be used as the specified sample (specified text sample) for the above-mentioned update. In an example, if a text sample group includes ten image samples, then for an image sample Y in the ten image samples, the text sample matched with the image sample X may be updated according to the text samples matched with the other nine image samples.

Since the image samples in an image sample group have the same entity information, the text samples matched with the image samples also have a certain degree of similarity. Therefore, the text sample matched with the specified image sample may be updated according to the text samples matched with the other image samples in the same image sample group, so as to enrich the text samples matched with the image samples. Based on a same principle, the image sample matched with the specified text sample may be updated according to the image samples matched with the other text samples in the same text sample group, so as to enrich the image samples matched with the text samples.

In an optional embodiment, updating the matching relationship of the specified sample according to the text samples or image samples matched with the other samples in the sample group except the specified sample may include: randomly selecting a first specified quantity of text samples or image samples from the text samples or image samples matched with the other samples as enhancement samples; and establishing a matching relationship between the enhancement samples and the specified samples.

In another optional embodiment, updating the matching relationship of the specified sample according to the text samples or image samples matched with the other samples in the sample group except the specified sample may include: determining a matching degree between the text samples or image samples matched with the other samples and the specified sample; selecting a text sample or image sample having a matching degree greater than a predetermined matching degree threshold from the text samples or image samples corresponding to the other samples as an enhancement sample; and establishing a matching relationship between the enhancement sample and the specified sample.

The matching degree between the text samples or image samples matched with the other samples and the specified sample may be determined by using a CLIP (Contrastive Language-Image Pre-Training) model.

The matching degree threshold may be predetermined according to actual needs or empiric values.

The text samples matched with the image samples in the same image sample group may have a large difference. For an image sample X, if the image sample X is updated according to the text samples matched with all other image samples in the same group, it is possible to introduce a text sample with a low matching degree with the image sample X, which may affect an accuracy of model training. By randomly selecting the first specified quantity of text samples as enhancement samples or selecting a text sample having a high matching degree as the enhancement sample, it is possible to reduce a probability of introducing text samples with low matching degree, so as to avoid an adverse effect of a combination of image samples and text samples with low matching degree on the model training. Based on the same principle, for a text sample group, by randomly selecting the first specified quantity of image samples as enhancement samples or selecting an image sample having a high matching degree as the enhancement sample, it is possible to reduce a probability of introducing text samples with low matching degree, so as to avoid an adverse effect of a combination of image samples and text samples with low matching degree on the model training.

Embodiments of the present disclosure do not specifically limit the type of sample group on which the above-mentioned update is performed. The above-mentioned update may be performed on the text sample matched with each image sample in an image sample group, or the image sample matched with each text sample in a text sample group, or both the image sample group and the text sample group.

In an optional embodiment, in a case that the above-mentioned update is performed on both the image sample group and the text sample group, duplicate matching relationships may exist, and a de-duplication may be performed to retain one record of the matching relationship and remove the other records of the matching relationship. In an example, for an image sample X and a text sample Y, a matching relationship between the image sample X and the text sample Y may be established when the text sample matched with the image sample X is updated according to the text samples matched with the other image samples in the image sample group to which the image sample X belongs, and the matching relationship between the image sample X and the text sample Y may also be established when the image sample matched with the text sample Y is updated according to the image samples matched with the other text samples in the text sample group to which the text sample Y belongs. Then one record of the matching relationship between the image sample X and the text sample Y may be retained.

In another optional embodiment, in the case that the above-mentioned update is performed on both the image sample group and the text sample group, if the matching relationship between the image sample X in the image sample group and the text sample Y is established firstly, the step of establishing the matching relationship between the text sample Y and the image sample X may be skipped when the image sample matched with the text sample Y in the sample group is updated.

In S203, the image generation model is trained according to any updated training set.

By aggregating and updating the samples in the training set, the amount of information in the samples in the training set may be increased, so that the image generation model may learn more abundant information, and the quality of the image generation model may be improved.

Optionally, a sample pair in which a similarity between the entity information of the image sample and the entity information of the text sample is greater than a predetermined similarity threshold is determined from each sample pair having a matching relationship in any updated training set, and the image generation model is trained according to each sample pair corresponding to a similarity greater than the similarity threshold. The sample pair includes an image sample and a text sample that have a matching relationship.

The similarity threshold in embodiments of the present disclosure may be set according to actual needs or empirical values. Based on the similarity threshold, the sample pair in which the entity information of the image sample is highly similar to the entity information of the text sample may be selected from each sample pair in the updated training set, and the image generation model may be trained according to the sample pair having a high similarity, which helps train an image generation model having a high accuracy.

Optionally, training the image generation model according to each sample pair corresponding to a similarity greater than a similarity threshold may include: determining a sample pair in which the entity quantity in the image sample is greater than a second specified quantity and the entity quantity in the text sample is greater than the second specified quantity from each sample pair corresponding to the similarity greater than the similarity threshold, and training the image generation model according to the sample pair.

The second specified quantity in embodiments of the present disclosure may be set according to actual needs or empirical values. Based on the second specified quantity, a sample pair having a large entity quantity may be further selected from the sample pairs having high similarity (referring to the similarity between the entity information of the image sample and the entity information of the text sample). The sample pair having a large entity quantity may provide more abundant information during the training process and help to train an image generation model with higher accuracy.

Optionally, step 103 of training the image generation model according to any training set selected from the first training set, the second training set or the third training set may include: constructing a loss function according to a generation loss and the entity information of the training set; and training the image generation model according to the training set and the constructed loss function.

Transform model as the image generation model is taken as an example below in describing a specific method of constructing the loss function.

At present, a method of training a Transform model is mainly based on a generation loss. A general expression form of a model training prediction is as follows.

$$p(y^i|x_{1\to m}, y_1^{i-1}) = G(\text{transform}(x)) \quad (1)$$

In Expression (1), x represents an input text, m represents a length of a text, $x_{1\to m}$ represents a text with a length m; y represents a set of predicted image block levels (tokens), i represents a sequence number of the image block level, $y^i$ represents a prediction of an $i^{th}$ image block level, $y_1^{i-1}$ represents a first image block level to an $(i-1)^{th}$ image block level; $p(y^i|x_{1\to m}, y_1^{i-1})$ represents a probability of the prediction of the $i^{th}$ image block level when $x_{1\to m}$ and $y_1^{i-1}$ are given, and G represents a generation function.

The current loss function is constructed as follows based on the generation loss.

$$\text{loss} = \Sigma_{i=1}^{n} -\log p(y^i)) \qquad (2)$$

In Expression (2), $p(y^i)$ represents a probability of a prediction of the $i^{th}$ image block level, n represents a length of a target output (that is, a total quantity of predicted image block levels), and the meanings of other parameters are the same as above.

In embodiments of the present disclosure, the loss function may be constructed as follows according to the entity information of any training set.

$$\text{loss} = \Sigma_{i=1}^{n} -\log p(y^i) + \Sigma_{j=1}^{k} -\log p(c) \qquad (3)$$

In Expression (3), c represents knowledge data in a knowledge graph, k represents a size of a set of entity information in the training set (that is, the quantity of entity information), p(c) represents a probability predicted by the model that the input text contains the knowledge data in the knowledge graph, and the meanings of other parameters are the same as above.

Based on the loss function of Expression (3), a general expression of a model training prediction is as follows.

$$p(c) = CLS(\text{transform}(x)) \qquad (4)$$

In Expression (4), CLS is a binary classification function, and other parameters are the same as above.

The method of constructing a loss function according to the entity information of any training set provided by embodiments of the present disclosure may be implemented to perform a knowledge enhancement during the training process, that is, force the model to learn relevant knowledge data during the training process, so that an image generation model with knowledge enhancement may be obtained.

Figure 3:
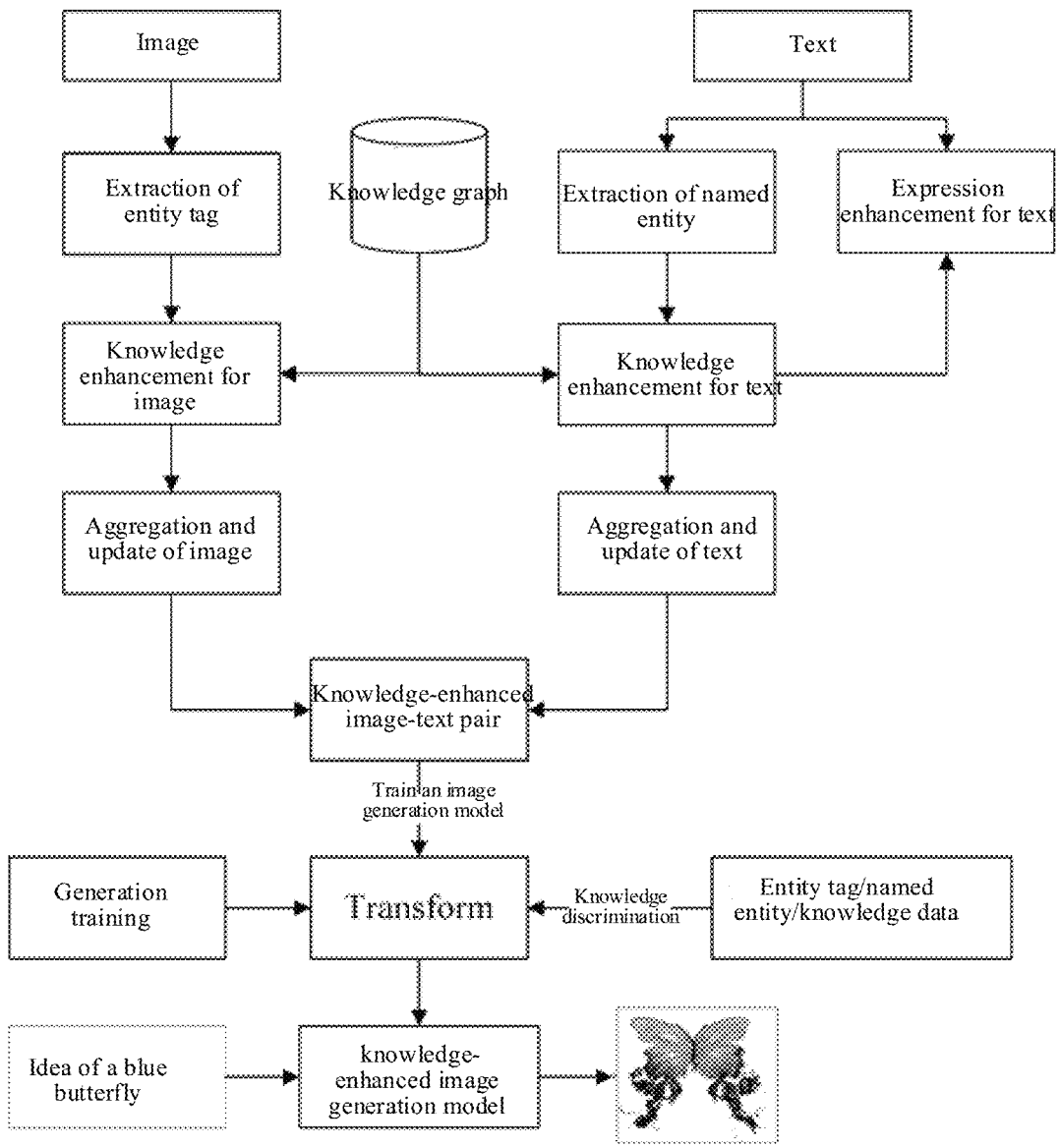
FIG. 3 shows a schematic diagram of an optional implementation of a method of training an image generation model provided by embodiments of the present disclosure.

FIG. 3 shows an optional embodiment of a method of generating an image provided by the present disclosure. Referring to FIG. 3, a principle of such embodiments is as follows.

An entity tag is extracted from an acquired image (as the first image sample), and an expression enhancement (optional step) and an extraction of named entity are performed on a text (as the first text sample) matched with the image; a knowledge enhancement is performed on the extracted image and text respectively based on the knowledge graph; the enhanced image and text are aggregated, and the text and image matched with the aggregated image and text are updated to obtain a knowledge-enhanced image-text pair for training a model; and an image generation model Transform is trained based on the image-text pair. During the training process, on the basis of the existing generation training, at least one of entity tag, named entity and knowledge data is introduced through a pre-built loss function to perform a knowledge discrimination (that is, a calculation of the loss function), so as to obtain a trained image generation model with knowledge enhancement.

Referring to the example in FIG. 3, after a text knowledge enhancement is performed, at least one cycle of text expression enhancement, named entity extraction and text knowledge enhancement may be performed.

The extraction, enhancement, update and other processing shown in FIG. 3 and the beneficial effects may refer to the previous content, and will not be repeated here.

Figure 4:
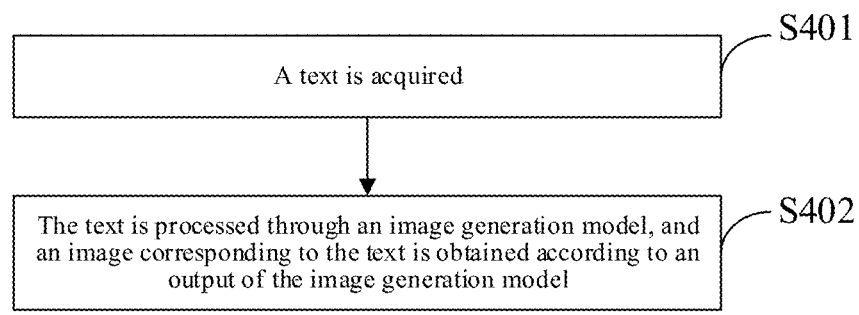
FIG. 4 shows a schematic flowchart of a method of generating an image provided by embodiments of the present disclosure.

According to embodiments of the present disclosure, the present disclosure further provides a method of generating an image. As shown in FIG. 4, the method includes the following steps.

In S401, a text is acquired.

In S402, the text is processed through an image generation model, and an image corresponding to the text is obtained according to an output of the image generation model. The image generation model is trained by the method of training the image generation model provided by any embodiment of the present disclosure.

FIG. 3 shows an example of a text. A text "idea of a blue butterfly" is input into the image generation model with knowledge enhancement, and an image containing a blue butterfly may be generated.

Through two methods of knowledge enhancement (knowledge enhancement on the samples in the training set and knowledge enhancement during the training process), an image generation model that has a high accuracy and learned knowledge data may be obtained. When the model is used for prediction, an image that is more in line with human cognition may be generated without any additional processing of the input text, and a semantic consistency between the output image and the input text may be greatly improved.

The technical solutions of the present disclosure may meet a creative image generation of a user during writing and generate a personalized image for the user, so that a creation efficiency may be improved, and an infringement probability of image copyright may be reduced.

Figure 5:
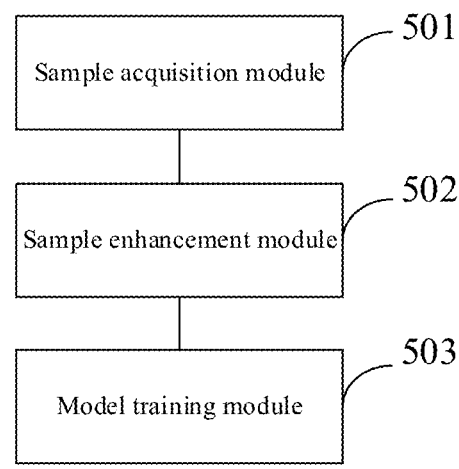
FIG. 5 shows a structural block diagram of an apparatus of training an image generation model provided by embodiments of the present disclosure.

According to embodiments of the present disclosure, the present disclosure further provides an apparatus of training an image generation model. As shown in FIG. 5, the apparatus includes a sample acquisition module 501, a sample enhancement module 502, and a model training module 503.

The sample acquisition module 501 may be used to acquire a first image sample and a first text sample matched with the first image sample.

The sample enhancement module 502 may be used to perform an enhancement on at least one type of sample in the first image sample and the first text sample according to a predetermined knowledge graph, so as to obtain at least one type of sample in a second image sample obtained by the enhancement and a second text sample obtained by the enhancement.

The model training module 503 may be used to train the image generation model according to a training set selected from a first training set, a second training set or a third training set, until the image generation model converges. The first training set includes the second image sample and the first text sample, the second training set includes the first image sample and the second text sample, and the third training set includes the second image sample and the second text sample.

In an optional embodiment, the sample enhancement module 502 includes a first information acquisition unit and a first information update unit.

The first information acquisition unit may be used to acquire a first entity information of the first image sample, and acquire first knowledge data matched with the first entity information from the knowledge graph.

The first information update unit may be used to update the first entity information of the first image sample according to the first knowledge data, so as to obtain the second image sample.

In another optional embodiment, the sample enhancement module 502 may include a second information acquisition unit and a second information update unit.

The second information acquisition unit may be used to acquire a second entity information of the first text sample, and acquire second knowledge data matched with the second entity information from the knowledge graph.

The second information update unit may be used to update the second entity information of the first text sample according to the second knowledge data, so as to obtain the second text sample.

In another optional embodiment, the sample enhancement module 502 may include an expression enhancement unit, a third information acquisition unit, and a third information update unit.

The expression enhancement unit may be used to perform an expression enhancement on the first text sample.

The third information acquisition unit may be used to acquire a third entity information of the first text sample obtained by the expression enhancement, and acquire third knowledge data matched with the third entity information from the knowledge graph.

The third information update unit may be used to update the third entity information of the first text sample according to the third knowledge data, so as to obtain the second text sample.

Optionally, the model training module 503 may include a sample aggregation unit, a sample update unit, and a model training unit.

The sample aggregation unit may be used to aggregate at least one type of sample selected from an image sample and a text sample in the training set, so as to obtain at least one type of sample group selected from an aggregated image sample group and an aggregated text sample group. The image sample is the first image sample or the second image sample, and the text sample is the first text sample or the second text sample.

The sample update unit may be used to update, for each specified sample in the sample group, a matching relationship of the specified sample according to a text sample or an image sample matched with other sample in the sample group except the specified sample.

The model training unit may be used to train the image generation model according to an updated training set.

In an optional embodiment, the sample aggregation unit is specifically used to: determine, for the training set, a plurality of image samples having a same entity information, and aggregate the plurality of image samples into one image sample group.

Optionally, when determining whether a plurality of image samples having a same entity information are contained or not, the sample aggregation unit is specifically used to: determine whether an entity quantity of each image sample is greater than a predetermined entity quantity threshold or not; and determine the plurality of image samples having the same entity information from each image sample having the entity quantity greater than the entity quantity threshold.

In another optional embodiment, the sample aggregation unit is specifically used to: determine, for the training set, a plurality of text samples having a same entity information, and aggregate the plurality of text samples into one text sample group.

Optionally, when determining whether a plurality of text samples having a same entity information are contained or not, the sample aggregation unit is specifically used to: determine whether an entity quantity of each text sample is greater than a predetermined entity quantity threshold or not; and determine the plurality of text samples having the same entity information from each text sample having the entity quantity greater than the entity quantity threshold.

In an optional embodiment, the sample update unit is specifically used to: randomly select a first specified number of text sample or image sample from the text sample or the image sample matched with the other sample as an enhancement sample; and establish a matching relationship between the enhancement sample and the specified sample.

In another optional embodiment, the sample update unit is specifically used to: determine a matching degree between the text sample or the image sample matched with the other sample and the specified sample; select a text sample or an image sample having a matching degree greater than a predetermined matching degree threshold from the text sample or the image sample corresponding to the other sample as an enhancement sample; and establish a matching relationship between the enhancement sample and the specified sample.

Optionally, the model training unit is specifically used to: determine a sample pair from each sample pair having a matching relationship in the updated training set, a similarity between the entity information of the image sample and the entity information of the text sample in the sample pair is greater than a predetermined similarity threshold, and train the image generation model according to each sample pair corresponding to a similarity greater than the similarity threshold. The sample pair includes an image sample and a text sample that have a matching relationship.

Optionally, when training the image generation model according to the sample pair, the model training unit is specifically used to: determine a sample pair from each sample pair corresponding to a similarity greater than the similarity threshold, and train the image generation model according to the sample pair. The entity quantity in the image sample in the sample pair is greater than a second specified quantity, and the entity quantity in the text sample in the sample pair is greater than the second specified quantity.

Optionally, the model training module 503 may include a function construction unit and a model training unit.

The function construction unit may be used to construct a loss function according to a generation loss and an entity information of the training set.

The model training unit may be used to train the image generation model according to the training set and the loss function.

Figure 6:
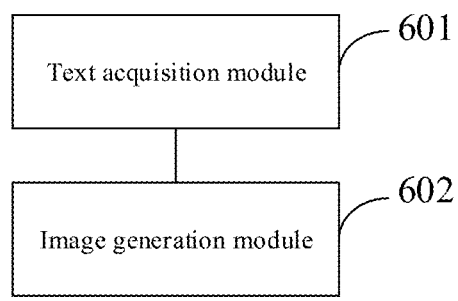
FIG. 6 shows a structural block diagram of an apparatus of generating an image provided by embodiments of the present disclosure.

According to embodiments of the present disclosure, the present disclosure further provides an apparatus of generating an image. As shown in FIG. 6, the apparatus includes a text acquisition module 601 and an image generation module 602.

The text acquisition module 601 may be used to acquire a text.

The image generation module 602 may be used to process the text by an image generation model, so as to obtain an image corresponding to the text according to an output of the image generation model. The image generation model is trained by the apparatus of training the image generation model provided by any embodiment of the present disclosure.

For the module units and functions of the apparatuses in embodiments of the present disclosure, reference may be made to the corresponding descriptions in the foregoing embodiments of methods, and details are not repeated here.

In the technical solutions of the present disclosure, a collection, a storage, a use, a processing, a transmission, a provision and a disclosure of user personal information involved comply with provisions of relevant laws and regulations, and do not violate public order and good custom.

According to embodiments of the present disclosure, the present disclosure further provides an electronic device, a non-transitory computer-readable storage medium, and a computer program product.

The electronic device provided by the present disclosure includes: an including: at least one processor; and a memory communicatively connected to the at least one processor. The memory stores instructions executable by the at least one processor, and the instructions, when executed by the at least one processor, cause the at least one processor to implement the method of training the image generation model or the method of generating the image provided by any embodiment of the present disclosure.

The non-transitory computer-readable storage medium provided by the present disclosure has computer instructions therein, and the computer instructions are used to cause a computer to implement the method of training the image generation model or the method of generating the image provided by any embodiment of the present disclosure.

The computer program product provided by the present disclosure contains a computer program, and the computer program, when executed by a processor, causes the processor to implement the method of training the image generation model or the method of generating the image provided by any embodiment of the present disclosure.

Figure 7:
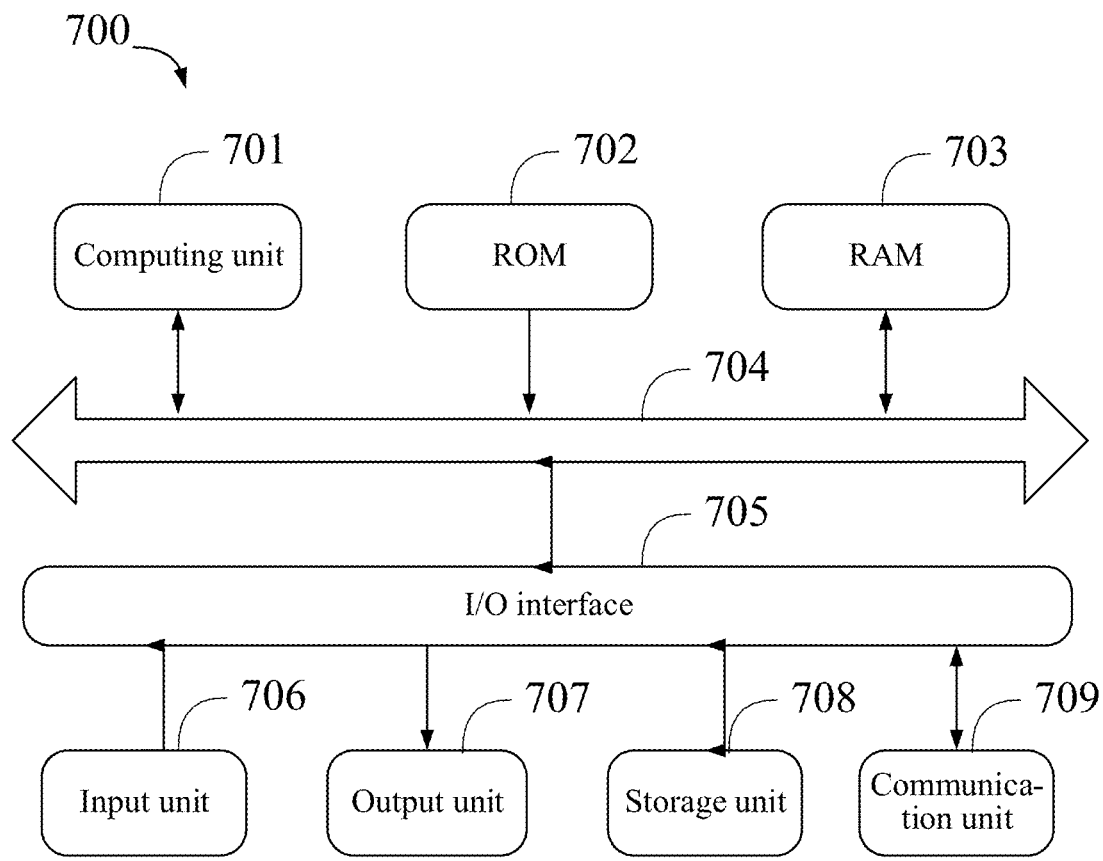
FIG. 7 shows a structural block diagram of an electronic device provided by embodiments of the present disclosure.

FIG. 7 shows a schematic block diagram of an example electronic device 700 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the electronic device 700 includes a computing unit 701 which may perform various appropriate actions and processes according to a computer program stored in a read only memory (ROM) 702 or a computer program loaded from a storage unit 708 into a random access memory (RAM) 703. In the RAM 703, various programs and data necessary for an operation of the electronic device 700 may also be stored. The computing unit 701, the ROM 702 and the RAM 703 are connected to each other through a bus 704. An input/output (I/O) interface 705 is also connected to the bus 704.

A plurality of components in the electronic device 700 are connected to the I/O interface 705, including: an input unit 706, such as a keyboard, or a mouse; an output unit 707, such as displays or speakers of various types; a storage unit 708, such as a disk, or an optical disc; and a communication unit 709, such as a network card, a modem, or a wireless communication transceiver. The communication unit 709 allows the electronic device 700 to exchange information/data with other devices through a computer network such as Internet and/or various telecommunication networks.

The computing unit 701 may be various general-purpose and/or dedicated processing assemblies having processing and computing capabilities. Some examples of the computing units 701 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 701 executes various methods and steps described above, such as the method of processing the image. For example, in some embodiments, the method of processing the image may be implemented as a computer software program which is tangibly embodied in a machine-readable medium, such as the storage unit 708. In some embodiments, the computer program may be partially or entirely loaded and/or installed in the electronic device 700 via the ROM 702 and/or the communication unit 709. The computer program, when loaded in the RAM 703 and executed by the computing unit 701, may execute one or more steps in the method of processing the image described above. Alternatively, in other embodiments, the computing unit 701 may be used to perform the method of processing the image by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, speech input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training an image generation model, the method comprising:
   acquiring a first image sample and a first text sample matched with the first image sample;
   performing an enhancement on at least one type of sample in the first image sample and the first text sample according to a predetermined knowledge graph, so as to obtain at least one type of sample in a second image sample obtained by the enhancement and a second text sample obtained by the enhancement; and
   training the image generation model according to a training set selected from a first training set, a second training set or a third training set, until the image generation model converges, wherein the first training set comprises the second image sample and the first text sample, the second training set comprises the first image sample and the second text sample, and the third training set comprises the second image sample and the second text sample.

2. The method according to claim 1, wherein the performing an enhancement on at least one type of sample in the first image sample and the first text sample according to a predetermined knowledge graph, so as to obtain at least one type of sample in an enhanced second image sample and an enhanced second text sample comprises:
   acquiring a first entity information of the first image sample, and acquiring first knowledge data matched with the first entity information from the knowledge graph; and
   updating the first entity information of the first image sample according to the first knowledge data, so as to obtain the second image sample.

3. The method according to claim 1, wherein the performing an enhancement on at least one type of sample in the first image sample and the first text sample according to a predetermined knowledge graph, so as to obtain at least one type of sample in an enhanced second image sample and an enhanced second text sample comprises:
   acquiring a second entity information of the first text sample, and acquiring second knowledge data matched with the second entity information from the knowledge graph; and
   updating the second entity information of the first text sample according to the second knowledge data, so as to obtain the second text sample.

4. The method according to claim 1, wherein the performing an enhancement on at least one type of sample in the first image sample and the first text sample according to a predetermined knowledge graph, so as to obtain at least one type of sample in an enhanced second image sample and an enhanced second text sample comprises:
   performing an expression enhancement on the first text sample;
   acquiring a third entity information of the first text sample obtained by the expression enhancement, and acquiring third knowledge data matched with the third entity information from the knowledge graph; and
   updating the third entity information of the first text sample according to the third knowledge data, so as to obtain the second text sample.

5. The method according to claim 1, wherein the training the image generation model according to a training set selected from a first training set, a second training set or a third training set comprises:
   aggregating at least one type of sample selected from an image sample and a text sample in the training set, so as to obtain at least one type of sample group selected from an aggregated image sample group and an aggregated text sample group, wherein the image sample is the first image sample or the second image sample, and the text sample is the first text sample or the second text sample;
   updating, for each specified sample in the sample group, a matching relationship of the specified sample according to a text sample or an image sample matched with other sample in the sample group except the specified sample; and
   training the image generation model according to an updated training set.

6. The method according to claim 5, wherein the aggregating at least one type of sample selected from an image sample and a text sample in the training set comprises determining, for the training set, a plurality of image samples having a same entity information, and aggregating the plurality of image samples into one image sample group.

7. The method according to claim 6, wherein the determining a plurality of image samples having a same entity information comprises:
 determining whether an entity quantity of each image sample is greater than a predetermined entity quantity threshold or not; and
 determining the plurality of image samples having the same entity information from each image sample having the entity quantity greater than the entity quantity threshold.

8. The method according to claim 5, wherein the aggregating at least one type of samples selected from an image sample and a text sample in the training set comprises determining, for the training set, a plurality of text samples having a same entity information, and aggregating the plurality of text samples into one text sample group.

9. The method according to claim 8, wherein the determining a plurality of text samples having a same entity information comprises:
 determining whether an entity quantity of each text sample is greater than a predetermined entity quantity threshold or not; and
 determining the plurality of text samples having the same entity information from each text sample having the entity quantity greater than the entity quantity threshold.

10. The method according to claim 5, wherein the updating a matching relationship of the specified sample according to a text sample or an image sample matched with other sample in the sample group except the specified sample comprises:
 randomly selecting a first specified number of text sample or image sample from the text sample or the image sample matched with the other sample as an enhancement sample; and
 establishing a matching relationship between the enhancement sample and the specified sample.

11. The method according to claim 5, wherein the updating a matching relationship of the specified sample according to a text sample or an image sample matched with other sample in the sample group except the specified sample comprises:
 determining a matching degree between the text sample or the image sample matched with the other sample and the specified sample;
 selecting a text sample or an image sample having a matching degree greater than a predetermined matching degree threshold from the text sample or the image sample corresponding to the other sample as an enhancement sample; and
 establishing a matching relationship between the enhancement sample and the specified sample.

12. The method according to claim 5, wherein the training the image generation model according to an updated training set comprises:
 determining a sample pair from each sample pair having a matching relationship in the updated training set, wherein a similarity between the entity information of the image sample and the entity information of the text sample in the sample pair is greater than a predetermined similarity threshold, and
 training the image generation model according to each sample pair corresponding to a similarity greater than the similarity threshold.

13. The method according to claim 12, wherein the training the image generation model according to each sample pair corresponding to a similarity greater than the similarity threshold comprises:
 determining a sample pair from each sample pair corresponding to a similarity greater than the similarity threshold, and
 training the image generation model according to the sample pair,
 wherein the entity quantity in the image sample in the sample pair is greater than a second specified quantity, and the entity quantity in the text sample in the sample pair is greater than the second specified quantity.

14. The method according to claim 1, wherein the training the image generation model according to a training set selected from a first training set, a second training set or a third training set comprises:
 constructing a loss function according to a generation loss and an entity information of the training set; and
 training the image generation model according to the training set and the loss function.

15. A non-transitory computer-readable storage medium having computer instructions therein, the computer instructions configured to cause a computer system to implement at least the method of claim 1.

16. A method of generating an image, the method comprising:
 acquiring a text;
 processing the text by an image generation model, so as to obtain an image corresponding to the text according to an output of the image generation model, wherein the image generation model is trained by a method of training the image generation model, the method training comprising:
  acquiring a first image sample and a first text sample matched with the first image sample;
  performing an enhancement on at least one type of sample in the first image sample and the first text sample according to a predetermined knowledge graph, so as to obtain at least one type of sample in a second image sample obtained by the enhancement and a second text sample obtained by the enhancement; and
  training the image generation model according to a training set selected from a first training set, a second training set or a third training set, until the image generation model converges, wherein the first training set comprises the second image sample and the first text sample, the second training set comprises the first image sample and the second text sample, and the third training set comprises the second image sample and the second text sample.

17. An electronic device, comprising:
 at least one processor; and
 a memory communicatively connected to the at least one processor, wherein the memory stores instructions executable by the at least one processor, the instructions, when executed by the at least one processor, are configured to cause the at least one processor to implement the method of claim 16.

18. The electronic device of according to claim 17, wherein the instructions, when executed by the processor, cause the processor further to implement:

acquiring a first entity information of the first image sample, and acquiring first knowledge data matched with the first entity information from the knowledge graph; and updating the first entity information of the first image sample according to the first knowledge data, so as to obtain the second image sample.

19. A non-transitory computer-readable storage medium having computer instructions therein, the computer instructions configured to cause a computer system to implement at least the method of claim 16.

20. An electronic device, comprising:

at least one processor; and a memory communicatively connected to the at least one processor, wherein the memory stores instructions executable by the at least one processor, the instructions, when executed by the at least one processor, are configured to cause the at least one processor to at least:

acquire a first image sample and a first text sample matched with the first image sample;

perform an enhancement on at least one type of sample in the first image sample and the first text sample according to a predetermined knowledge graph, so as to obtain at least one type of sample in a second image sample obtained by the enhancement and a second text sample obtained by the enhancement; and train an image generation model according to a training set selected from a first training set, a second training set or a third training set, until the image generation model converges, wherein the first training set comprises the second image sample and the first text sample, the second training set comprises the first image sample and the second text sample, and the third training set comprises the second image sample and the second text sample.

* * * * *